US005238461A

United States Patent [19]

Gotman

[11] Patent Number: 5,238,461

[45] Date of Patent: Aug. 24, 1993

[54] REACTIONLLESS DIFFERENTIAL ROTARY DRIVER HAVING OPTIMIZED OUTPUT TORQUES

[76] Inventor: Alexander S. Gotman, 1131 Californa Ave., Apt. 204, Santa Monica, Calif. 90403

[21] Appl. No.: 653,682

[22] Filed: Feb. 11, 1991

[51] Int. Cl.[5] .................... F16H 1/42

[52] U.S. Cl. .................... 475/248; 475/332; 81/57.31; 81/56

[58] Field of Search .............. 475/248, 151, 331, 332; 81/55, 57.31, 56; 173/29, 50, 163, 164; 192/41 R

[56] References Cited

U.S. PATENT DOCUMENTS

| | | | |
|---|---|---|---|
| 1,343,667 | 6/1920 | Evensen | 81/56 |
| 1,893,231 | 1/1935 | Floyd | 192/41 R |
| 2,228,638 | 1/1941 | Mercier | 475/248 X |
| 2,322,247 | 6/1943 | Mercier | 475/248 |
| 2,584,115 | 2/1952 | Dinsmoor | 475/332 X |
| 3,331,269 | 7/1967 | Sauter | 81/57.31 |
| 3,584,527 | 6/1971 | Bosten | 81/56 |
| 3,646,834 | 3/1972 | Davis | 475/248 |
| 3,865,219 | 2/1975 | Dossier | 192/41 R X |
| 3,942,398 | 3/1976 | Fletcher et al. | 81/57.31 X |
| 4,132,131 | 1/1979 | DeBruyne | 475/332 X |
| 4,903,518 | 2/1990 | Kimura et al. | 475/332 X |
| 4,976,669 | 12/1990 | Jones | 475/248 |
| 5,009,621 | 4/1991 | Bankstahl et al. | 475/248 X |
| 5,035,309 | 7/1991 | Takada | 192/41 R X |
| 5,083,989 | 1/1992 | Yates et al. | 475/332 X |
| 5,088,969 | 2/1992 | Arndt | 475/332 X |

*Primary Examiner*—Leslie A. Braun
*Assistant Examiner*—Khoi Q. Ta

[57] ABSTRACT

A differential rotary driver includes a power input shaft, a differential gear mechanism arranged coaxial to the power input shaft and having two output gears with mutually opposite rotations, and a housing which rotatably supports both input shaft and differential gear mechanism. The housing also has a rigid, crank-shaped lateral extension portion.

Within the lateral extension portion of the housing both a central output shaft and a circumferentially concentric output shaft are rotatably supported on an axis which is laterally offset relative to the axis of the input shaft. Driving gears provided on the two output shafts are driven by corresponding output gears of the differential mechanism.

When rotary power is applied between the housing and the power input shaft, an operator holding the housing experiences no reaction torque at any stage of the tightening of a fastener.

The gear ratios may be selected such that the output torque of the circumferential output shaft is at least twice the output torque of the central output shaft.

18 Claims, 2 Drawing Sheets

T1 = 24, 32
T2 = 36, 38, 40
T3 = 42
T4 = 64, 60
T5 = 57, 55
T6 = 10, 13, 14, 15

REACTIONLESS DIFFERENTIAL ROTARY DRIVER HAVING OPTIMIZED OUTPUT TORQUES

BACKGROUND OF THE INVENTION

Differential rotary drivers for tightening threaded fasteners having means at the threaded end of the bolt or pin to be drivingly engaged with a driver or the like have been well known though not extensively used. Such machines typically have two concentric output shafts which rotate concurrently in opposite directions. One output shaft is typically a central shaft and the other is circumferential, surrounding the central shaft. The central shaft is adapted to engage the bolt or pin of a fastener while the circumferential shaft engages the nut or collar. Such machines are shown, for example, in U.S. Pat. No. 2,928,302 issued in 1960 to Owen et al, entitled "MEANS FOR ACHIEVING A PREDETERMINED EXTENT OF LOADING IN TIGHTENING UP NUTS ON BOLTS AND STUDS"; in U.S. Pat. No. 3,041,902 issued in 1962 to Wing, entitled "MOTOR OPERATED HAND TOOL FOR SETTING FASTENERS"; and in U.S. Pat. No. 3,331,269 issued in 1967 to Sauter, entitled "DRIVING GUN".

All of the machines shown in those prior patents were portable, and the hand of the operator supported the housing or stator of a primary driver within which a power input shaft or rotor was drivingly rotated. In all of those machines both output shafts were coaxial to the power input shaft. One output shaft could be said to rotate in the clockwise direction while the other could be said to rotate in the counterclockwise direction. The clockwise output shaft would create a reaction torque to the operator of the machine in a counterclockwise direction and the counterclockwise output shaft would create a reaction torque to the operator in the opposite or clockwise direction.

It may have been a design objective of such machines to equalize those two reaction torques so that there would then be no net reaction torque experienced by the operator. This was clearly implied in the Sauter patent which stated at Col. 3, lines 56–60:

". . . these torques may be equal so that there is no torque upon the operator holding the driving gun 10. In the present gun there is a slight amount of such torque due to the speed reducing effects of sun gear 66, planet gears 74 and 76 and ring gear 84."

However, Sauter's machine failed to eliminate the reaction torque. Sauter's explanation of the problem was also wrong, because in the type of machine shown by Sauter it was both theoretically and practically impossible to eliminate the reaction torque imposed upon the hand of the operator. The machines described in the Owen et al patent and in the Wing patent also failed to eliminate reaction torque imposed upon the operator, and for the same reason.

Recent medical research has shown that operators of power drivers and the like, who experience reaction torque on a regular basis, are prone to chronic and serious ailments of the hand. Hence it is indeed important to eliminate this problem.

Another very desirable design objective for a differential rotary drive machine, but which the machines shown in the three patents described did not meet, is the establishment of optimum driving torques for the two output shafts.

Thus the present invention deals with eliminating the reaction torque experienced by the operator, and at the same time optimizing the driving torques of the two output shafts.

SUMMARY OF THE INVENTION

According to the present invention a differential rotary driver includes a primary driver fixedly supported within a housing such that the extension of the rotor of the primary driver serves as a power input shaft; and a differential gear mechanism arranged coaxial to the power input shaft, supported for rotation within the housing, and having two output gears with mutually opposite rotations. The housing also has a rigid, laterally extending crank-shaped portion or lever arm within which a central output shaft is rotatably supported on an axis laterally offset relative to the axis of the power input shaft. A circumferential output shaft concentrically surrounds the central output shaft. The two output shafts have input gears which are driven by corresponding output gears of the differential mechanism. When the two output shafts are correspondingly engaged with the bolt and the nut of a fastener a closed system is provided which contains all of the forces, including reaction forces, internally. No external forces are either received or exerted by the system, and when rotary power is applied between the housing and the power input shaft an operator holding the housing experiences no reaction torque.

Preferably the gear ratios are also selected to optimize the ratio of the two output torques.

Thus the objects of the present invention are to provide a rotary driver which eliminates any reaction torque that would be imposed upon the hand of the operator, and at the same time provides an optimum torque ratio for the two output shafts.

DRAWING SUMMARY

DETAILED DESCRIPTION OF FIGS. 1 AND 2

Figures 1, 3:
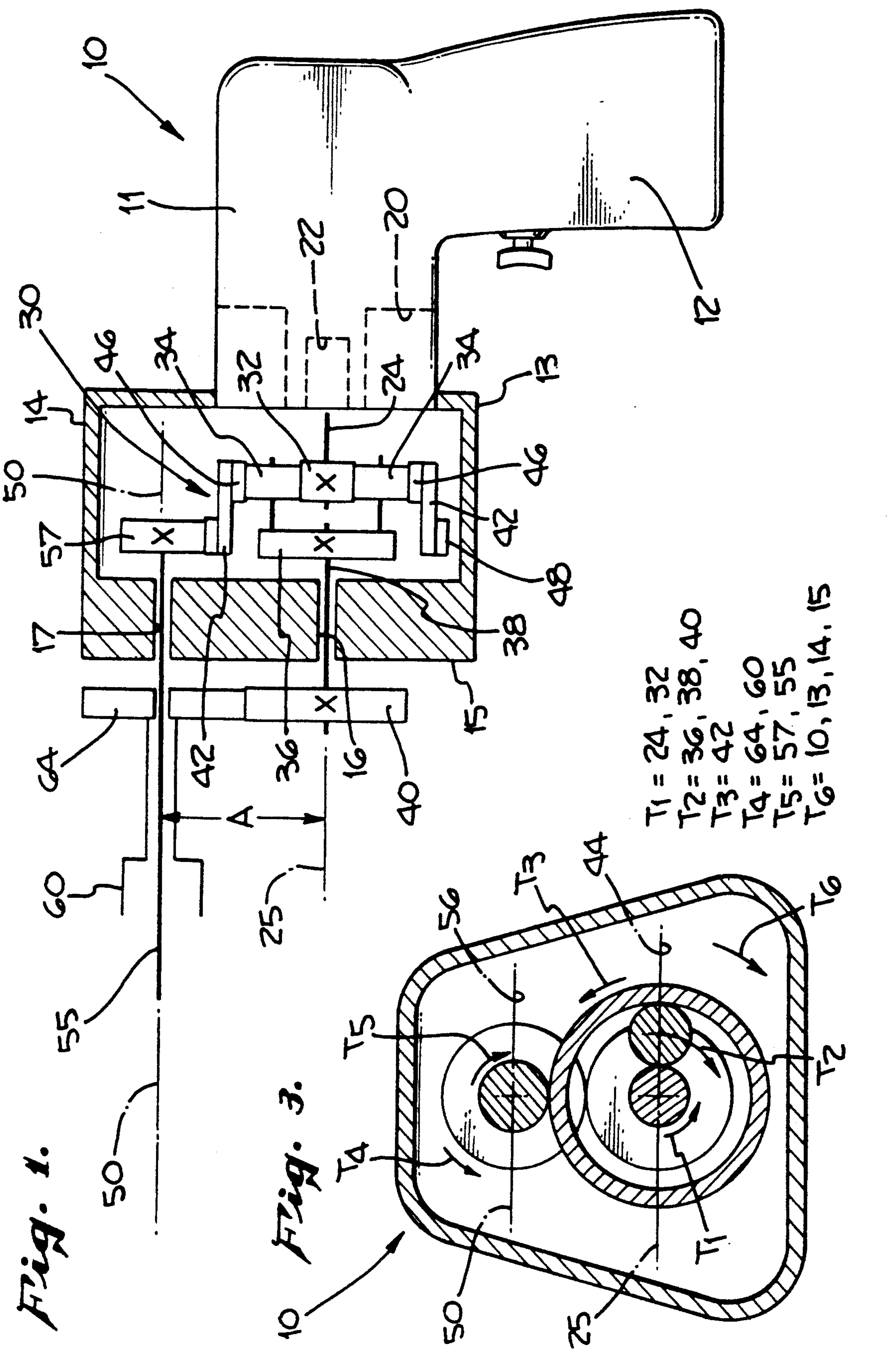
FIG. 1 is a schematic side elevation view of a hand tool in accordance with the present invention.
FIG. 3 is a schematic transverse cross-sectional view of the mechanism of FIG. 1 showing both operating and reaction torques which exist in the interior of the mechanism.

As shown schematically in FIG. 1 the present invention includes a housing 10 having a main or driving portion 11, a pistol grip handle 12, and a forward portion 13. The forward portion 13 has an upward extension 14. The driving portion 11 and pistol grip handle 12 are shown in solid lines while the forward portion 13, 14, is shown in cross-section. Within the driving portion 11 of the housing a stator 20 and rotor 22 of a primary driver are shown in dotted lines. A power input shaft 24 is fixedly attached to rotor 22 and extends into forward housing portion 13.

A differential gear mechanism is arranged coaxial to the power input shaft, supported for rotation within the forward housing 13, and has two output gears with mutually opposite rotations. Specifically, the differential mechanism 30 includes a sun gear 32 attached to the forward end of power input shaft 24 in a fixed and non-rotatable relationship as indicated by symbol "x". Surrounding the sun gear 32 is a set of planetary gears 34 which rotate about the sun gear 32 on respective shafts of a cage 36. From the output of the cage 36 there extends an output extension shaft 38 in a fixed and non-rotatable relationship as indicated by symbol "x". Extension shaft 38 on its forward end carries a first output gear 40. A ring gear 42 is rotatably supported inside the housing portion 13. The ring gear has inner teeth 46 which are engaged by planetary gears 34, and outer teeth 48 which act as a second output gear. The forward wall 15 of the housing portion 13, 14 has a first opening 16 which is coaxial with power input shaft 24 and through which the extension shaft 38 passes, being rotatably supported in the opening 16. The axis of power input shaft 24 and output extension shaft 38 is designated as 25.

Wall 15 also extends upward and forms a part of the housing upward extension 14 where it has a second and upper opening 17, laterally displaced in the upward direction from power input shafts 24, 38. A central output shaft 55 is rotatably supported in the second opening 17, and thus is laterally offset relative to the axis of the power input shaft 24 and the output extension shaft 38. A first input gear 57 is fixedly attached to the rearward end of output shaft 55 and is drivingly engaged by the outer teeth 48 of ring gear 42, i.e., the second output gear. A circumferential output shaft 60 concentrically surrounds the central output shaft 55 and is rotatably supported thereon. Its rearward end is fixedly attached to a second input gear 64, which in turn is drivingly engaged by first output gear 40. Thus the two output shafts have input gears which are driven by corresponding output gears of the differential mechanism. The axis of output shafts 55, 60, is designated as 50. Axis 50 is laterally offset or displaced from axis 25 by a distance A.

Figures 2, 4:
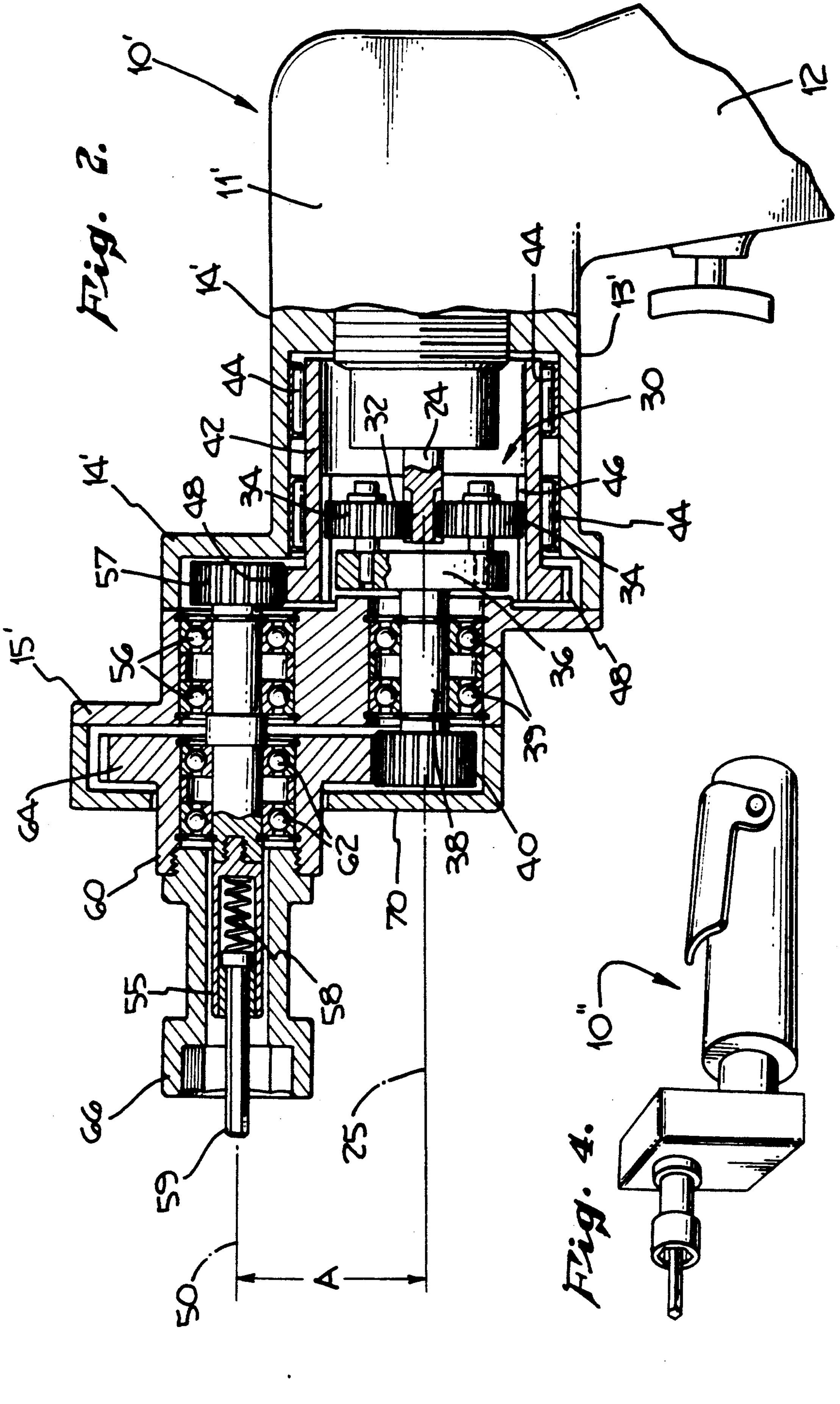
FIG. 2 is a side elevation view of the hand tool of FIG. 1, shown partly in cross-section to expose the internal parts in some detail.
FIG. 4 shows an alternate form of housing in accordance with the invention.

Although the schematic representation of FIG. 1 will be well understood by those skilled in the art, the actual mechanical details of one preferred embodiment are shown in FIG. 2. Some of the corresponding parts shown in FIG. 2 are modified somewhat, and the reference number then bears a prime ′.

As shown in FIG. 2, the differential rotary drive tool of the present invention includes a housing 10′ having a downwardly depending pistol grip handle 12, and containing a primary driver whose output is provided on a power input shaft 24. The driver may be powered by an air motor, an electric motor, or other means not shown. The axis of power input shaft 24 is designated by numeral 25. The differential gear mechanism 30 is coaxial with that axis. An independent axis 50 that is laterally offset from the axis 25 extends through the housing extension portion 14′. While the differential gear mechanism may have one, two, or more stages, in the presently preferred embodiment of the invention there is only a single stage.

The forward end of ring gear 42 has an enlarged extension 48 forming an externally toothed gear, which is a second output gear of the differential mechanism. Spur gear 40 and ring gear 42 are both coaxial with the axis 25 of power input shaft 24, and are rotatable in mutually opposite directions.

Bearings necessary for support of the rotating parts are also shown in FIG. 2. Power input shaft 24 is supported by bearings within housing portion 11′ (not specifically shown). The main portion of ring gear 42 (not including external teeth 48) is rotatably supported within housing portion 13′ by means of bearings 44. Extension shaft 38 is supported from housing wall 15′ by bearings 39. Central output shaft 55 driven by spur gear 57 is supported in housing wall 15′ by bearings 56. And circumferential output shaft 60 is supported from central output shaft 55 by bearings 62. Thus, both of the output shafts 55 and 60 are rotatably supported from the crank or extension portion 14′, 15′ of housing 10′ by means of the bearings 62, 56, and are coaxial with the laterally displaced axis 50.

A housing front cover 70 is removably attached to housing portion 15′ in order to protect the teeth of output gears 40 and input gear 64. Another feature of modular construction is that the housing portion 15′ which contains bearings 39, 56, and shafts 38, 55 is removably attached to the housing portion 14′.

It is significant that the housing 10′ is a rigid structure which essentially provides a crank arm of length A between the axes 25 and 50. While the actual or relative value of the distance A may be varied as a design parameter, its existence is indispensable to the present invention. That is to say, the important function of the tool in eliminating the reaction torque imposed upon the operator is dependent upon the fact that output shafts 55, 60, and their axis 50 are laterally offset from input shaft 24 and output extension shaft 38, and their axis 25, with both being rotatably supported from the same housing. In one presently preferred embodiment of the invention as shown in FIGS. 1 and 2 the output shafts 55, 60, are arranged precisely parallel to the power input shaft 24 and output extension shaft 38, or substantially so.

Output shaft 60 is formed integral with input gear 64 and carries a box or socket wrench 66 for engaging the nut or collar. Central output shaft 55 carries an allen wrench 59 adapted to be received in the wrench opening of the bolt or pin of a fastener. A spring 58 which occupies the hollow forward end of shaft 55 resiliently supports the allen wrench 59 to permit it to have axial movement relative to the shaft. The allen wrench 59 and the box or socket wrench 66 are adapted to be applied concurrently to a fastener, not shown, in a manner that is well known in the art. It will be understood that wrenches 59 and 66 are merely illustrative and that if desired other means of engagement may instead be used on the ends of output shafts 55 and 60.

It will be understood that the output drives that are provided on the output gears 40, 48, of the differential gear mechanism necessarily provide different gear ratios relative to the rotation rate of the power input shaft 24. The gear trains consisting of gears 40, 64, and 48, 57, make possible a selection of different gear ratios and hence of different output torques to be separately and simultaneously applied to the bolt and nut of a fastener. Where an allen wrench is used on the central output shaft, the ratio of the output torque of circumferential shaft 60 to the output torque of central output shaft 55 should preferably be at least 2:1, and about 4:1.

From a reading of the three prior patents listed above it appears that there was an inadequate understanding of the importance of optimizing the ratio of output torques. The present invention is based in part upon a recognition of the fact that there is a maximum value of torque loading which should be applied to the bolt or pin, and that there is also a maximum value of torque loading which should be applied to the nut or collar. Based on these maximum values my calculations have shown that where an allen wrench is used on the central shaft the output torque of the central shaft should be at least twice and preferably about four times smaller than the output torque of the circumferential shaft, in order to prevent possible breakage of the allen wrench. One of the accomplishments of the present invention is that this optimum ratio of output torques is achievable.

In the presently preferred embodiment of the invention only one planetary gear stage is used. The rotation rate of the ring gear 42, 48, is selected to be 1:3 relative to the rotation rate of input drive gear 32. The rotation rate of first output gear 40 is selected as 1:4 relative to the rotation rate of input drive gear 32. Thus the rotation rate of first output gear 40 relative to ring gear 42, 48, is 3:4. The gears 40 and 64 are given an equal number of teeth so that the ratio of gear 64 to gear 40 is 1:1. The ratio of gear teeth and hence the rate of rotation of drive gear 57 relative to ring gear 42, 48, is 3:1. The rate of rotation of the circumferential output shaft 60 relative to the central output shaft 55 is therefore 1:4. Because of the gear ratios thus selected, the output torque drivingly applied to the circumferential shaft 60 and box wrench 66 is four times that which is applied to the central output shaft 55 and allen wrench 59. This works well in the typical situation. Thus in the preferred embodiment of the invention the output torque of the allen wrench 59 is selected as four times smaller than that of the box wrench 66.

In the illustration of FIG. 2 the gear 64 is provided with about three times as many teeth as the gear 40 so that the difference between torques is even greater than that described above. This gear ratio is preferred for some applications of the tool.

MODULAR CONSTRUCTION

Referring still to FIG. 2, it will be seen that the tool of the present invention is arranged for convenient modular assembly and disassembly. Thus in the housing 10' the main housing portion 11', pistol grip 12, and forward housing portion 13', 14' are all constructed as an integral unit. Housing portion 15' is easily removable from housing portion 14', and housing front cover 70 is easily removable from housing portion 15'. Shaft 55 is made in two longitudinal sections and its hollow forward portion is threaded into the rearward portion. And box wrench 66 has a threaded rearward end which is threaded into the shaft 60. These features of construction facilitate easy assembly of the tool during manufacture, as well as easy disassembly in the event repairs are required.

While the invention has presently been illustrated using spur gears to transfer power from the differential mechanism to the output shafts, bevel gears may be used if so desired. It is then not necessary for the laterally offset axis 21 to be precisely parallel to the axis 20.

EMBODIMENT OF FIG. 4

FIG. 4 shows an alternate form of the invention in which the housing 10'' has no pistol grip. This modification presents no problem to the operator because the reaction torque is totally absorbed inside the tool engaged with a fastener.

OPERATION (FIG. 3)

In the machine of the present invention, when the wrenches on the two output shafts are correspondingly engaged with the bolt and the nut of a fastener the housing 10 provides a closed system within which the forces are balanced. No external forces are either received or exerted by the system, and when rotary power is applied between the housing and the power input shaft an operator holding the housing experiences no reaction torque. This relationship is now described with reference to FIG. 3.

The rotating mechanisms which are coaxial with the main axis of rotation 25 are all supported for rotation relative to housing 10 by means of bearings 44 that support the smooth outer cylindrical surface portion of the ring gear 42, 48, and the bearings 39 that support the shaft 38. The rotating mechanisms which are coaxial with the lateral axis of rotation 50 are all supported for rotation relative to housing 10 by means of bearings 56 that support the inner end of central shaft 55 relative to the housing crank portion 14', 15'. FIG. 3 indicates schematically that lower rotating parts concentric to axis 25 are supported from housing 10 by bearings 44, while upper rotating parts concentric to axis 50 are supported from housing 10 by bearings 56.

As shown in FIG. 3 a driving torque T1 is applied to the power input shaft 24 and the input gear 32 which tends to rotate that gear in a counterclockwise direction. The rotation of gear 32 causes the planetary gear system 34, 36, 38, to also rotate in a counterclockwise direction, thus inducing a reaction torque T2 from the tightening fastener in the clockwise direction. Since the planetary gear system operates in a well known manner to produce a reversed rotation of the ring gear 42, causing it to rotate in the clockwise direction, a reaction torque T3 is also induced in the ring gear, which is in the counterclockwise direction.

The driving torque applied to central output shaft 55 is counterclockwise, inducing a clockwise reaction torque as shown by arrow T5. Circumferential output shaft 60 is driven in clockwise rotation and its reaction torque from the fastener is counterclockwise as shown by arrow T4. The reaction torques T4 and T5 are opposite but not equal.

A fundamental law of the differential mechanism is that the algebraic sum of all of the torques T1, T2, and T3 about axis 25 is at all times equal to zero. The driving force induced by a power agent (such as compressed air, magnetic field, etc.) acts between the rotor and the stator or housing, creating equal and opposite torques T1 and T6.

Thus, the net of reaction torques is rotationally counterbalanced by the torque T1 exerted by the input shaft 24 (the rotor of the primary driver). The torque T1 produces at the same time a torque (the so called "reaction of the wheel") of the same magnitude around axis 50, laterally applied through the shaft 38, bearings 39, crank-shaped portion 14' of the housing 10 and bearings 56 to the shaft 55, thus tending to rotate the whole tool counterclockwise around the axis 50 (because the shaft 55 is laterally supported by the fastener secured to the work and hence laterally unmoveable). The above tendency is counterbalanced by the equal and opposite torque T6 of the stator or housing which also is laterally supported by the fastener through the shaft 55 and bearings 56. The result then is that all of the driving and reaction torques in the system are dynamically balanced, having an algebraic sum that is always equal to zero.

It should be mentioned that the given design is intended to be used either with fasteners that have their own "torque-off" feature or by being adjusted by energy input control to produce a predetermined maximum torque. An installation of a torque control unit at any place within the mechanism will expand the field of application of the invention.

EMBODIMENT PREFERRED FOR A SPECIAL SITUATION

In a typical situation the nut turns fairly easily on the bolt, prior to engaging the work piece itself, while the bolt encounters a considerable amount of friction to restrain it from rotating within the hole. In such a typical situation the present invention works very well, in the manner described above.

In certain special situations, however, it is rather easy to turn the bolt in the hole but not very easy to turn the nut on the bolt. This is true, for example, for certain high performance fasteners where the friction of the nut upon the bolt is deliberately made high in order to resist being loosened by vibration or the like. If the reaction torque generated by the nut from the bolt is greater than that generated by the bolt from the hole, the invention as heretofore described will not work. Instead, the rotation of the nut will carry the bolt in rotation with it, both output shafts will rotate in synchronism, and free run of the nut along the bolt will not be achieved.

According to the invention this problem is solved very simply. The bearings 56 instead of being just ball bearings are also selected to incorporate an overrunning or one-way clutch such that spur gear 57, central output shaft 55, and allen wrench 59 may rotate in the counterclockwise direction, but not in the clockwise direction. The resulting operation then is that the output shaft 55, the allen wrench 59, and the bolt are not rotating. The input spur gear 64 then drives the circumferential shaft 60, box wrench 66, and the nut in clockwise rotation driving the nut along the bolt until a considerable amount of tightening action has been achieved. The mounting friction between the bolt and the work piece then induces a greater reaction torque from the nut, which is reflected back through the system and the differential mechanism so as to induce a reaction torque T5 in the clockwise direction from the allen wrench 59, precisely as it was described in the OPERATION paragraph, above.

While presently preferred embodiments of the invention have been described in detail in order to comply with the patent laws, many variations therefrom are possible as will be readily understood by those skilled in the art. The scope of the invention is therefore to be measured only in accordance with the appended claims.

What I claim is:

1. A differential rotary driver comprising:

a housing having a main portion, a handle, a forward portion, and a lateral extension formed on said forward portion;

a primary driver having a stator fixedly supported within said main portion of said housing, and a rotor extending into said housing forward portion and serving as a power input shaft;

a differential gear mechanism disposed within said housing forward portion including a sun gear fixedly attached to the forward end of said power input shaft, a set of planetary gears circumdisposed about said sun gear and supported on respective shafts of an associated cage, an extension shaft coaxial with said power input shaft which extends forwardly from said cage in a non-rotatable relationship therewith, a first output spur gear on the forward end of said extension shaft, and a ring gear having inner teeth which are engaged by said planetary gears and outer teeth which act as a second output gear;

bearing means rotatably supporting an external surface portion of said ring gear within said forward portion of said housing;

said housing forward portion having a laterally extending wall with a first opening therein through which said extension shaft extends, said first opening having bearing means rotatably supporting said extension shaft;

said laterally extending wall also extending into said lateral extension portion of said housing and having a second opening therein which is laterally displaced from said first opening;

a central output shaft arranged substantially parallel to said extension shaft and rotatably supported by associated bearing means in said second opening of said laterally extending wall;

a first input spur gear fixedly attached to the rearward end of said central output shaft and drivingly engaged by the outer teeth of said ring gear;

a circumferential output shaft coaxial with and concentrically surrounding said central output shaft and rotatably supported by associated bearing means thereon;

a second input spur gear fixedly attached to the rearward end of said circumferential output shaft and drivingly engaged by said first output gear;

means on the forward end of said central output shaft for engaging a bolt; and means on the forward end of said circumferential output shaft for engaging a nut;

said output shafts therefore being adapted to rotate in mutually opposite directions and to produce a net reaction torque which is then balanced by said extension shaft, said lateral extension of said housing, and said bearings, without being transmitted externally of said housing.

2. A reactionless differential rotary drive mechanism comprising:

a housing;

differential drive means including an input shaft supported from said housing and adapted to be rotatably driven relative thereto, and first and second output gears concentric to said input shaft and rotatable in mutually opposite directions, said second output gear being a ring gear having both internal and external teeth and said first output gear being an external tooth gear;

a central output shaft rotatably supported from said housing in laterally offset relation to said input shaft;

a circumferential output shaft rotatably supported from said housing in concentric relation to said central output shaft;

said central output shaft having an input gear driven by said external teeth of said second output gear; and said circumferential output shaft having an input gear driven by said first output gear.

3. The mechanism of claim 2 wherein the ratio of the output torque of said circumferential shaft to the output torque of said central output shaft is at least 2:1.

4. The mechanism of claim 3 wherein the ratio of the output torque of said circumferential shaft to the output torque of said central output shaft is about 4:1.

5. A reactionless differential rotary drive mechanism comprising:

a housing;

differential drive means including an input shaft supported from said housing and adapted to be rotatably driven relative thereto, and first and second output gears concentric to said input shaft and rotatable in mutually opposite directions, said second output gear being a ring gear having both internal and external teeth and said first output gear being an external tooth gear;

a central output shaft disposed in laterally offset relation to said input shaft, having associated bearing means rotatably supporting said central output shaft from said housing;

a circumferential output shaft rotatably supported from said central output shaft in concentric relation thereto;

said central output shaft having an input gear driven by said external teeth of said second output gear;

said circumferential output shaft having an input gear driven by said first output gear; and said bearing means including a one-way clutch so that said circumferential output shaft cannot overpower said central output shaft and cause it to rotate in the wrong direction.

6. A differential rotary drive mechanism comprising:

a primary driver having a rotor;

differential drive means including an input shaft driven by said rotor and first and second output gears concentric to each other and rotatable in mutually opposite directions, said second output gear being a ring gear having both internal and external teeth and said first output gear being an external tooth gear;

an output assembly including coaxial central and circumferential counter rotating output shafts having respective input gears; and rigid housing means rotatably supporting both said differential drive means and said output shafts in such relationship that the axis of rotation of said output shafts is laterally offset relative to the axis of rotation of said rotor, and said external teeth of said second output ring gear drive said input gear of said central output shaft and said first output gear drives said input gear of said circumferential output shaft.

7. The mechanism of claim 6, wherein the ratio of the output torque of said circumferential shaft to the output torque of said central output shaft is at least 2:1.

8. The mechanism of claim 7 wherein the ratio of the output torque of said circumferential shaft to the output torque of said central output shaft is about 4:1.

9. A differential rotary drive mechanism comprising:

a primary driver having a rotor;

differential drive means including an input shaft driven by said rotor and first and second output gears concentric to each other and rotatable in mutually opposite directions, said second output gear being a ring gear having both internal and external teeth and said first output gear being an external tooth gear;

an output assembly including coaxial central and circumferential counter rotating output shafts having respective input gears;

bearing means rotatably supporting said central output shaft from said housing;

rigid housing means rotatably supporting both said differential drive means and said output shafts in such relationship that the axis of rotation of said output shafts is laterally offset relative to the axis of rotation of said rotor, and said external teeth of said second output ring gear drive said input gear of said central output shaft and said first output gear drives said input gear of said circumferential output shaft; and wherein said bearing means includes a one-way clutch so that said circumferential output shaft cannot overpower said central output shaft and cause it to rotate in the same direction.

10. A reactionless differential rotary drive machine for tightening a nut onto a bolt, comprising:

a rigid housing;

a rotor rotatably supported from said housing and adapted to be rotatably driven relative to said housing;

a central output shaft for removably engaging the bolt;

a circumferential output shaft concentric to said central output shaft for removably engaging the nut;

said housing rotatably supporting both said central output shaft and said circumferential output shaft in laterally offset relation to the axis of said rotor;

differential gear means of the planetary type rotatably supported by said housing, said rotor being drivingly coupled to said differential gear means, and said differential gear means having an external tooth output gear and an output ring gear having both internal and external teeth; and a spur gear on said central output shaft coupled to said external teeth of said output ring gear, and a spur gear on said circumferential output shaft coupled to said external tooth output gear, for rotatably driving said two shafts concurrently but in opposite rotational sense.

11. A powered nut-runner for securing threaded fasteners of the type in which both the threaded end of a bolt and an interfitting nut are provided with wrench engagement means, which consists of a housing, a primary driver having a stator and a rotor, means supporting the rotor for rotation relative to the housing, a differential mechanism having an input driven from the rotor and two separate outputs, and coaxial inner and outer output shafts carrying respective wrenches, characterized by means for preventing an externally manifested reaction torque of the housing, said reaction torque prevention means comprising:

the outputs of the differential mechanism being coaxial and including an output ring gear having both internal and external teeth and an external tooth output gear;

the housing including a rigid lateral extension;

means rotatably supporting both of the output shafts from said housing extension in laterally offset relation to the rotor; and said external teeth of said output ring gear drivingly engaging said inner output shaft, and said external tooth output gear drivingly engaging said outer output shaft.

12. A powered nut-runner as in claim 11 which includes bearing means supporting said inner output shaft from said housing extension, and separate bearing means supporting said outer output shaft from said inner output shaft.

13. A powered nut-runner as in claim 12 wherein said outer output shaft provides a greater torque than said inner output shaft and said bearing means supporting said inner output shaft from said housing extension includes an overrunning one-way clutch, so that said inner output shaft is prevented from rotating with said outer output shaft.

14. A hand-held differential rotary driver consisting of a housing, a primary driver having a rotor supported by the housing, a differential gear mechanism supported from the housing and having an input shaft rotatably driven by the rotor and having two separate outputs, and coaxial, counter-rotating output shafts driven by the differential gear mechanism, which differential driver is adapted to protect the hand and arm of the operator from experiencing from experiencing reaction torque, characterized by:

- said differential gear mechanism having first and second output gearings, said first output gearing being an external tooth gear and said second output gearing being a ring gear having internal and external teeth;
- the housing having a lateral extension portion which extends laterally from the rotor;
- said coaxial output shafts including a central shaft and a circumferential shaft, each having its own drive gearing;
- means supporting said coaxial output shafts from said lateral extension portion of the housing in laterally offset relation to the rotor; and
- the external teeth of said second output gearing of said differential gear mechanism being drivingly coupled to the drive gearing of said central output shaft, and said first output gearing of said differential gear mechanism being drivingly coupled to the drive gearing of said circumferential output shaft.

15. The hand-held differential rotary driver of claim 14 wherein the ratio of the output torque of said circumferential shaft to the output torque of said central output shaft is at least 2:1.

16. The hand-held differential rotary driver of claim 15 wherein the ratio of the output torque of said circumferential shaft to the output torque of said central output shaft is about 4:1.

17. The hand-held differential rotary driver of claim 14 which includes:

- separate bearing means rotatably supporting said central output shaft; and
- wherein said bearing means includes an overrunning clutch so that said circumferential output shaft cannot overpower said central output shaft and cause it to rotate in the same direction.

18. A reactionless differential rotary drive mechanism comprising:

- a housing;
- differential drive means including an input shaft rotatably supported from said housing, and first and second output gears concentric to said input shaft and rotatable in mutually opposite directions, said second output gear being a ring gear having both internal and external teeth and said first output gear being an external tooth gear;
- a central output shaft and a concentric outer output shaft disposed in laterally offset relation to said input shaft, said output shafts being rotatably supported from said housing;
- said central output shaft having an input gear driven by said external teeth of said second output gear, and said outer output shaft having an input gear driven by said first output gear;
- said outer output shaft providing a greater output torque than said central output shaft; and
- bearing means providing rotatable support for said central output shaft and including a one-way clutch so that said central output shaft is prevented from rotating with said outer output shaft.

* * * * *